UNITED STATES PATENT OFFICE.

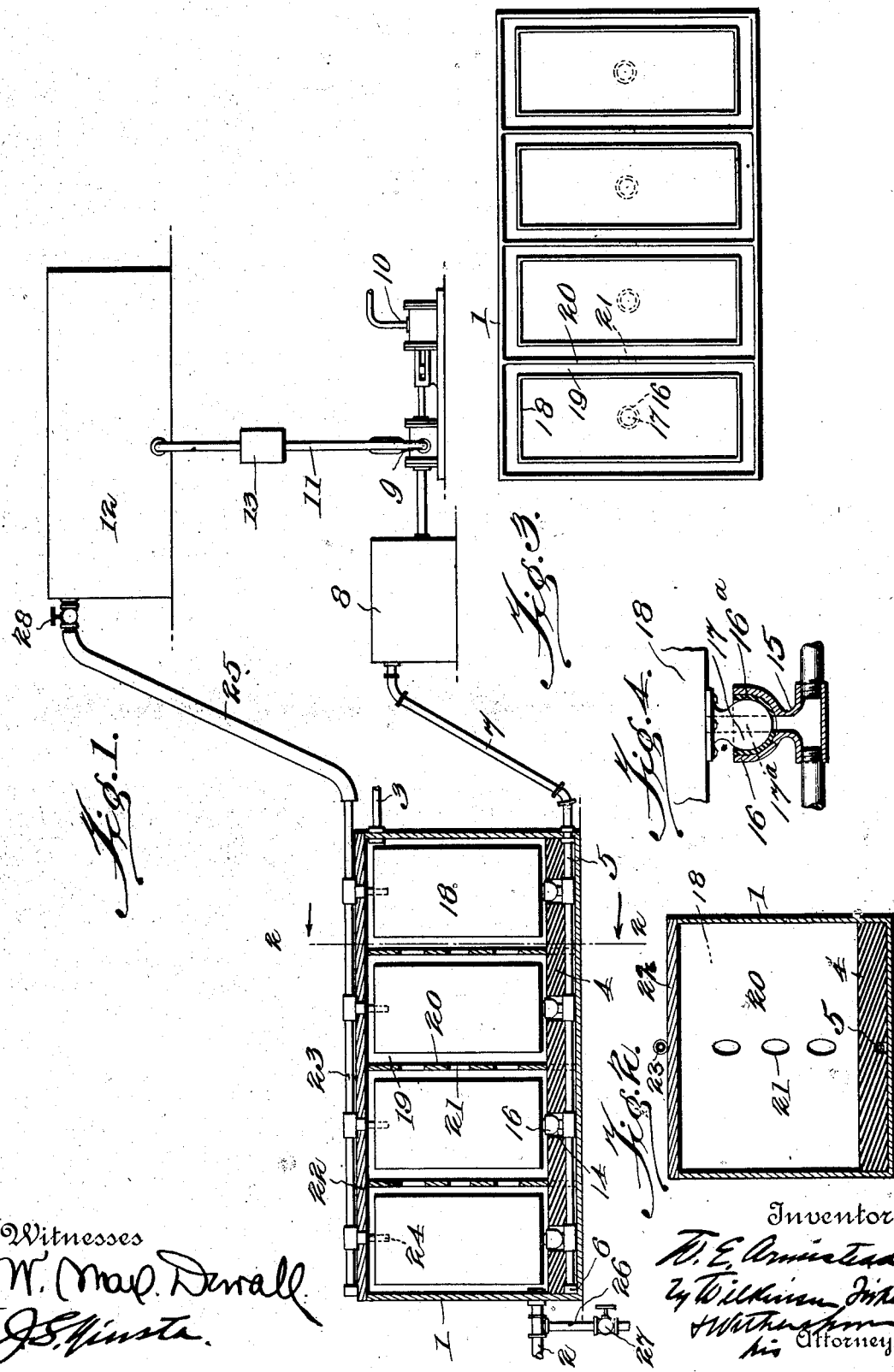

WILLIAM E. ARMISTEAD, OF SANDERSVILLE, GEORGIA.

APPARATUS FOR MANUFACTURING ICE.

1,027,305.      Specification of Letters Patent.    Patented May 21, 1912.

Application filed August 22, 1910. Serial No. 578,323.

*To all whom it may concern:*

Be it known that I, WILLIAM E. ARMISTEAD, a citizen of the United States, residing at Sandersville, in the county of Washington and State of Georgia, have invented certain new and useful Improvements in Apparatus for Manufacturing Ice; and I do hereby declare the following to be a full, clear, and exact description of the invention, such as will enable others skilled in the art to which it appertains to make and use the same.

This invention relates to an apparatus for manufacturing clear and pure ice from raw water, and the primary object of the invention is to conduct raw water reduced to a very low temperature to the ice forming cans and conducting said water therethrough continuously during the process of freezing, carrying same back to the forecooler or initial receptacle for first cooling the raw water, a filtering medium being introduced between the discharge end of the ice forming tanks and the forecooling chamber.

In carrying out my process I may introduce the raw water to the ice forming cans either from the top or from the bottom and conducting the same back to the forecooling chamber from the top or bottom, as the case may be.

In the accompanying drawings, however, illustrating a practical arrangement of an apparatus for carrying on my process, and for simplicity of illustration, I have simply shown an apparatus in which the water is introduced from the forecooling chamber to the top of the ice forming cans and is conducted from the bottom of the ice forming cans, during the process of formation of ice and carried back to the forecooling chamber. It will be understood that my invention is not restricted, therefore, to any particular apparatus for carrying out same, but for the purpose of disclosure reference is had to the accompanying drawings illustrating one form of apparatus in which like characters designate the same parts in the several views, and in which—

Figure 1 is a longitudinal sectional view through a series of ice forming cans contained within an outer brine tank, the forecooling chamber, pump and other apparatus being shown in elevation. Fig. 2 is a cross section on the line 2—2 of Fig. 1, showing one of the division plates in elevation. Fig. 3 is a plan view looking down on the outer brine tank and the ice forming cans, the cover being removed, and Fig. 4 is a sectional detail of one form of water tight joint between the outer pipe and the bottom of each ice forming can.

1 is an outer brine tank provided with an inlet 2 and an outlet 3 leading from and returning to a suitable brine cooling tank, not shown. The bottom of the brine tank is provided with a layer of insulation material 4, and below said insulation material is disposed a pipe 5 headed at one end, as at 6, and extending outwardly, as at 7, to a reservoir 8 communicating with a pump 9 driven by a suitable steam or other engine 10, the pump 9 having a conduit 11 leading to a forecooling apparatus 12, common to ice manufacture, and a filter 13 being disposed between the pipe 5 and the forecooling chamber 12, but preferably located in the pipe line between the pump 9 and the forecooling chamber 12.

The insulation 4 is apertured, as at 14, to receive a nipple 15 forming part of a T-joint, the nipple 15 of which spreads out to form a semi-cylindrical socket 16 adapted to snugly receive a ball member 17, connected with the bottom of each ice forming can 18 located in the outer brine tank 1 within compartments 19 formed by the division plates 20 extending laterally across said outer brine tank 1 and provided with a vertical series of apertures 21 forming communicating passages between said compartments 19.

It will be understood that the ball and socket connection just described and shown more clearly in Fig. 4 is only one of several water tight connections that might be made between the outlet pipe 5 and the ice forming cans 18. It will also be observed that the ball member 17 is provided with a port 17ª therethrough which registers with the bore of the nipple 15, and, as shown, a suitable packing of rubber or other proper material 16ª may be introduced between the ball and socket members of the joint to make the water tight joint more effective.

22 designates a cover for the outer brine tank, and this cover 22 is provided with a headed inlet pipe 23 provided with nozzles or nipples 24 projecting through said cover and extending a predetermined distance down in each of the ice forming cans 18. One end of this pipe 23 is connected by means of a flexible connection 25 with the forecooling chamber 12 and enters said forecooling chamber or reservoir at the top thereof. It will be also observed that the pipe 7 enters the auxiliary reservoir 8 at the top thereof, a little below the top of the ice forming cans, the object being to maintain the level of the water in the ice forming cans so as not to overflow same.

In carrying out the process through the apparatus hereinbefore described raw water of a very low temperature from the forecooling chambers is conducted through the flexible pipe 25, the inlet pipe 23 and the nozzles 24 into the ice forming cans 18, which will fill up to the level prescribed by the discharge from the pipe 7 into the reservoir 8. After this level has been reached the water is continuously circulated through each of the cans, passing through the water tight joint 15, into the pipe 5, through the pipe 7 into the reservoir 8, from whence it is pumped by the pump 9 back again to the forecooling chamber 12, a filter being disposed in the conduit between the pump and the forecooling chamber. Thus a continuous circulation of purified raw water, at a very low temperature, passes through the cans during the freezing process, and the nozzles being centrally disposed of the cans and the outlets therefrom being opposite the nozzles, as the ice forms around the sides a channel is maintained centrally of the block until final congealing takes place. If the contents of one of the cans should freeze through more quickly than the other it does not affect the operation of the other cans.

It will be understood that the cooling brine introduced at 2 thoroughly circulates around the ice forming cans in the chambers 19, passing from one compartment to the other through the vertical series of apertures 21 and division plates 20. It will also be understood that the flexible connection 25 will allow of the ready removal of the cover 22 from the tanks without disconnecting the pipe 23 from the forecooling chamber. It will also be obvious that while I have described the apparatus as comprising a single series of ice forming cans and a single brine tank, several series may be coupled up by suitable headers. It will also be obvious that where the invention is used with a single series of cans or several series, a suitable outlet is provided for draining off the brine when the ice is to be harvested, and this is essential in order that the brine tank will not flood into the pipe 5 when the ice forming cans are withdrawn. A simple illustration of this is shown at the left of Fig. 1, in which the inlet brine pipe is provided with a pipe 26 having a cock 27 and suitably discharging back into the brine cooling tank, not shown. It will also be understood that the outlet from the forecooler will be provided with a suitable valve, as indicated at 28.

I claim:

1. An ice making apparatus, comprising an outer tank separated by a series of perforated partitions into a number of chambers for the cans, a series of cans, one for each chamber, a water pipe leading below said cans, and a coupling between each can and said water pipe, consisting of two members, one member attached to the bottom of the can, and the second member connected to said water pipe, and projecting above the bottom of the chamber, whereby when the brine is drawn off from the tank, none can enter the second member of said coupling, substantially as described.

2. An ice making apparatus, comprising an outer tank separated by a series of perforated partitions into a number of chambers for the cans, a series of cans, one for each chamber, a water pipe leading below said cans, and a coupling consisting of a ball and socket joint connecting said water pipe with the interior of said can, one member of said coupling being connected to the can, and the other member of said coupling being connected to the water pipe, and the latter member having its top projecting above the bottom of the tank, substantially as described.

3. An ice making apparatus, comprising a brine chamber, a can mounted in said chamber, a water pipe located beneath said chamber, a perforated coupling consisting of two members connecting said water pipe with the interior of said can, one member of said coupling being connected to said can, and the other member of said coupling being connected to said water pipe, the second member projecting above the bottom of said tank, with means for causing a flow of raw water through said can, substantially as and for the purposes described.

4. An ice making apparatus, comprising a brine chamber, a can mounted in said chamber, a water pipe located beneath said chamber, a perforated coupling consisting of two members forming a ball and socket joint, connecting said water pipe with the interior of said can, one member of said coupling being connected to said can, and the other member of said coupling being connected to said water pipe, the second member projecting above the bottom of said tank, with means for causing a flow of raw water through said can, substantially as and for the purposes described.

5. In an ice making apparatus, the combination with a can and a water pipe, of a coupling connecting said water pipe with the interior of the can, consisting of a ball and socket joint, one member of which is connected to the can, and the other member connected to the water pipe, substantially as and for the purposes described.

6. In ice making apparatus, the combination of an outer or brine tank, ice forming cans, means for continuously introducing raw water in said ice forming cans, means for continuously carrying off the water from said ice forming cans during the formation of ice therein, means for preserving the level of raw water in said ice forming cans, and means for circulating a cooling medium around said ice forming cans, substantially as described.

7. In ice making apparatus, the combination of an outer or brine tank, ice forming cans therein, a main reservoir, a conduit leading from said main reservoir to said ice forming cans, an auxiliary reservoir, a conduit leading from said ice forming cans to said auxiliary reservoir and discharging therein at a predetermined position below the top of said ice forming cans to maintain a level therein, a conduit leading from said auxiliary reservoir to said main reservoir, pumping means therefor, and means for circulating a cooling medium around said ice forming cans, substantially as described.

8. In ice making apparatus, the combination of an outer or brine tank, ice forming cans therein, a main reservoir, a conduit between said main reservoir and said ice forming cans, eduction means for continuously conducting the water from said ice forming cans to said reservoir and maintaining the level in said ice forming cans, said eduction means having in its conduit a filtering media, substantially as described.

9. In ice forming apparatus, the combination of a forecooling chamber, an outer brine tank, inner ice forming cans, an auxiliary reservoir, a conduit leading from said forecooling chamber to said ice forming cans, and continuously conducting raw water therein at a low temperature, a conduit leading from said ice forming cans to said auxiliary reservoir for continuously withdrawing the water from said ice forming cans during the formation of ice therein, a conduit from said auxiliary tank to said forecooling chamber, said conduit being provided with pumping means and filtering means, substantially as described.

10. In ice making apparatus, the combination of an outer or brine tank having spaced compartments therein, means for introducing, circulating, and withdrawing brine from said brine tank, ice forming cans located within said compartments, a main reservoir for raw water, means continuously conducting said raw water to said ice forming cans during the formation of ice therein, means for conducting off said raw water from said ice forming cans during the formation of ice therein, comprising an outlet conduit having water tight joints between said conduits and said ice forming cans, and means for withdrawing the brine from said brine tank prior to harvesting, whereby the brine from said brine tank is excluded from said outlet conduit when said water tight joints are disconnected substantially as described.

In testimony whereof, I affix my signature, in presence of two witnesses.

WILLIAM E. ARMISTEAD.

Witnesses:
J. S. GINSTA,
GEO. B. PITTS.